Jan. 26, 1971 J. H. ANDERSON 3,558,439
WATER DESALTING PROCESS AND APPARATUS
Filed Dec. 28, 1967 5 Sheets-Sheet 3
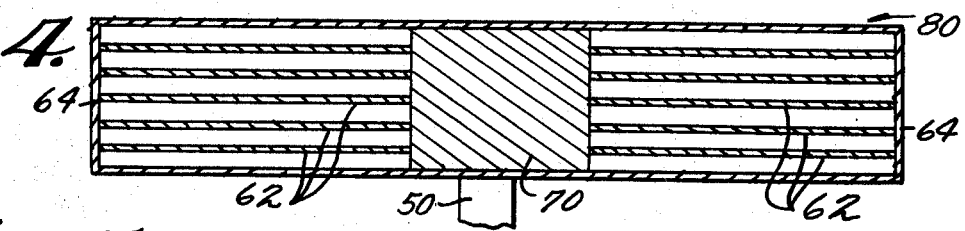
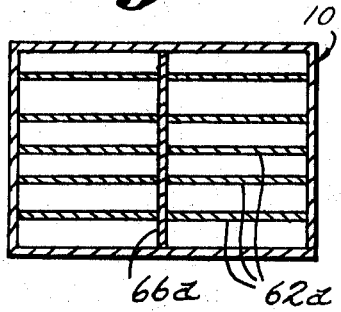
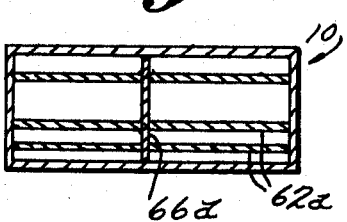
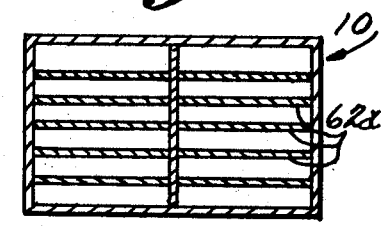
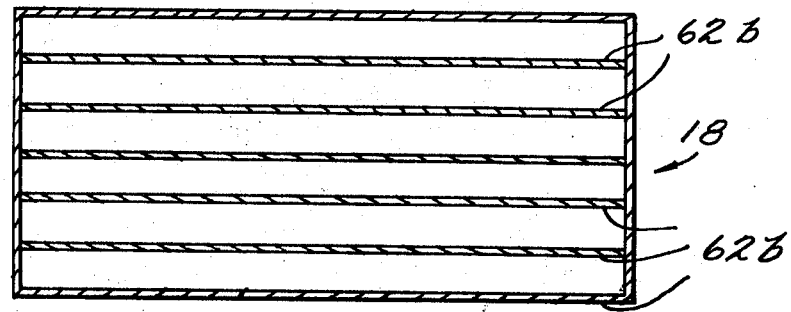
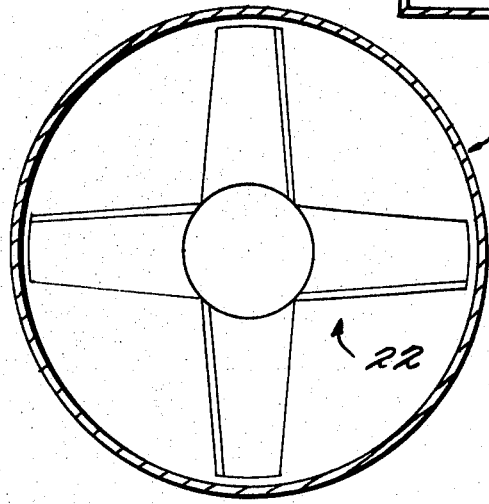
INVENTOR.
JAMES H. ANDERSON
BY
Cushman Darby & Cushman
ATTORNEYS

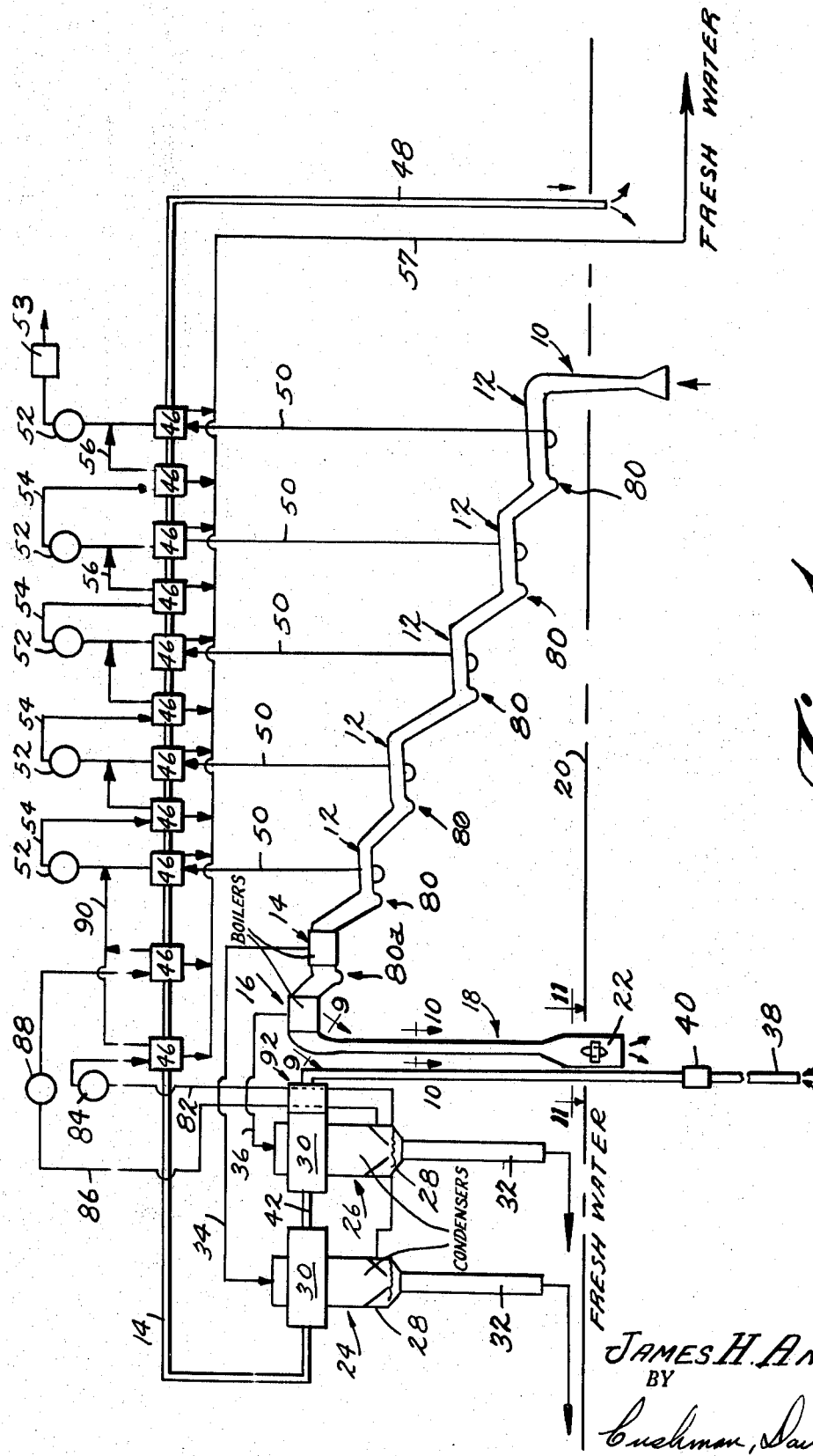

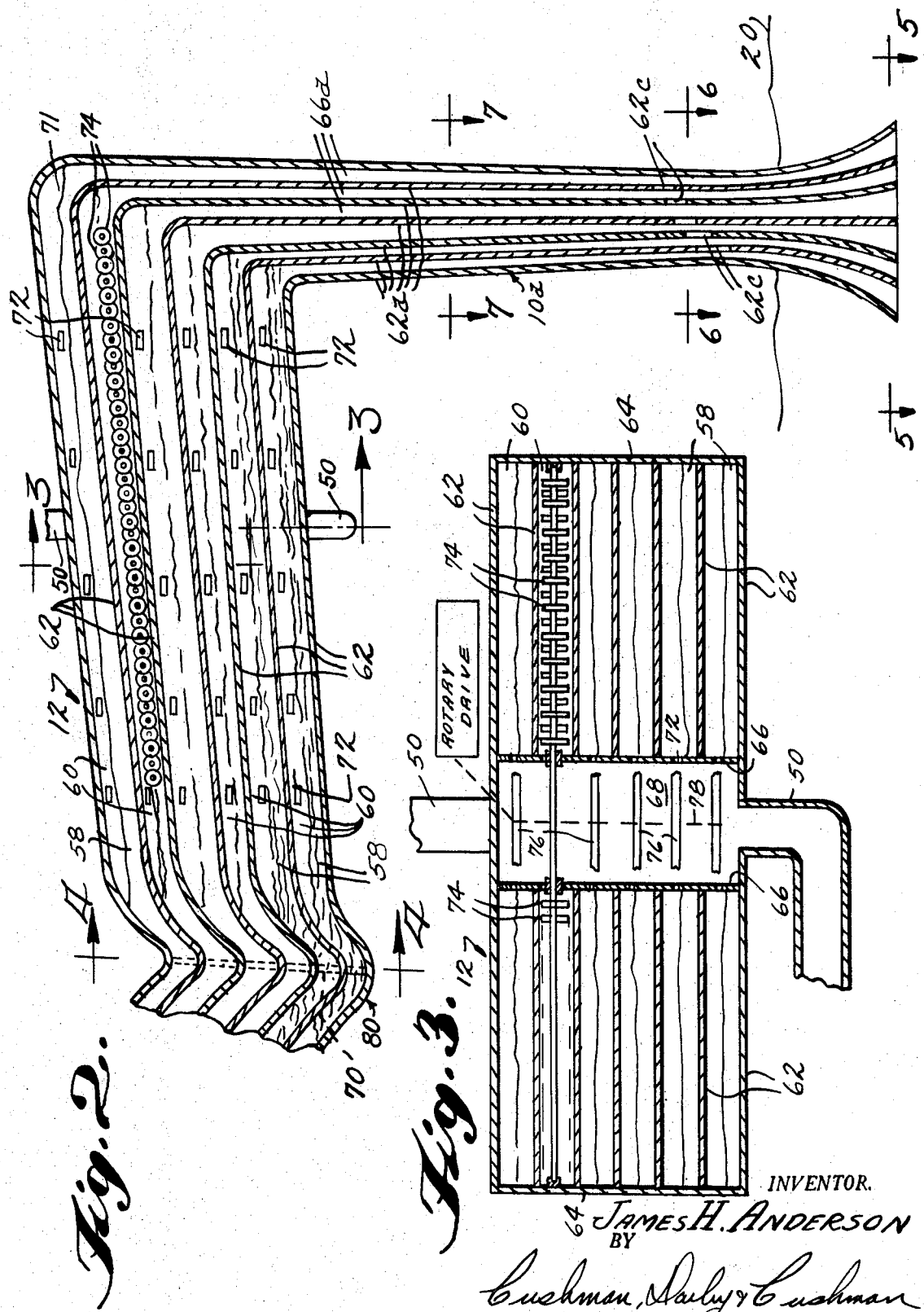

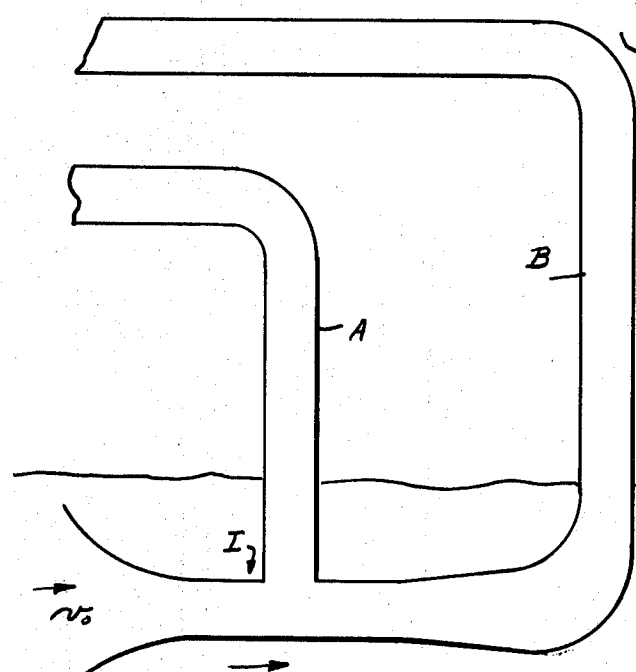
Fig. 14.
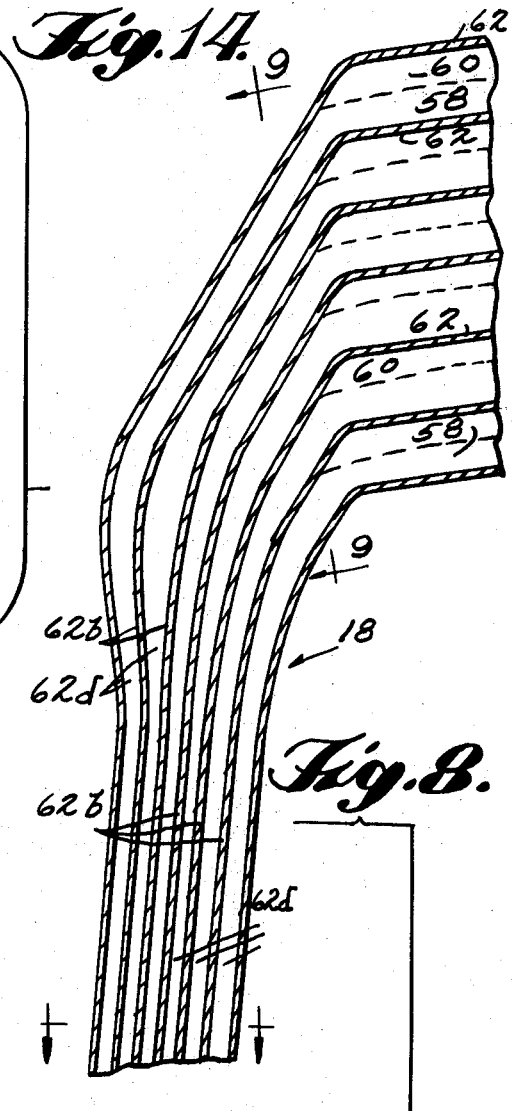
Fig. 8.
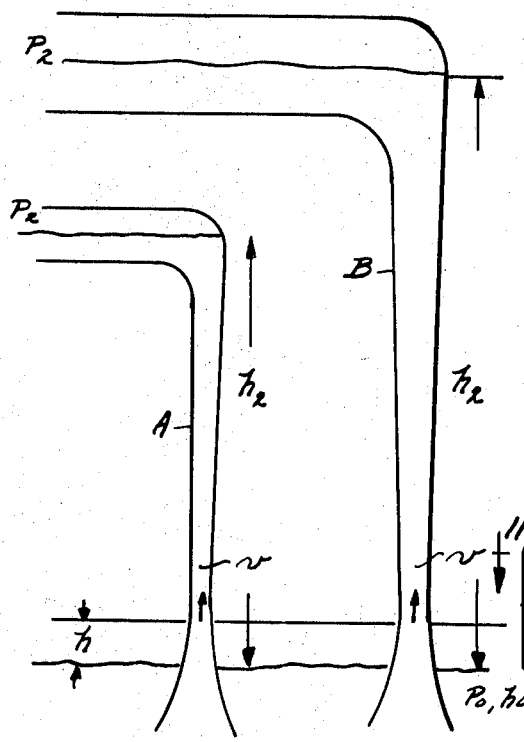
Fig. 13.
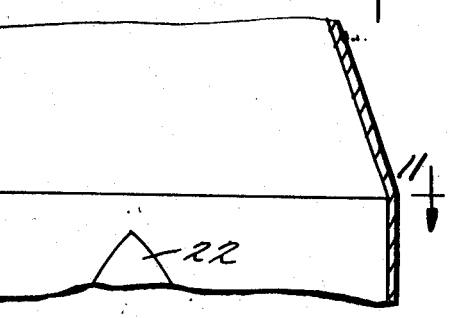
INVENTOR
JAMES H. ANDERSON
BY Cushman Darby & Cushman
ATTORNEYS

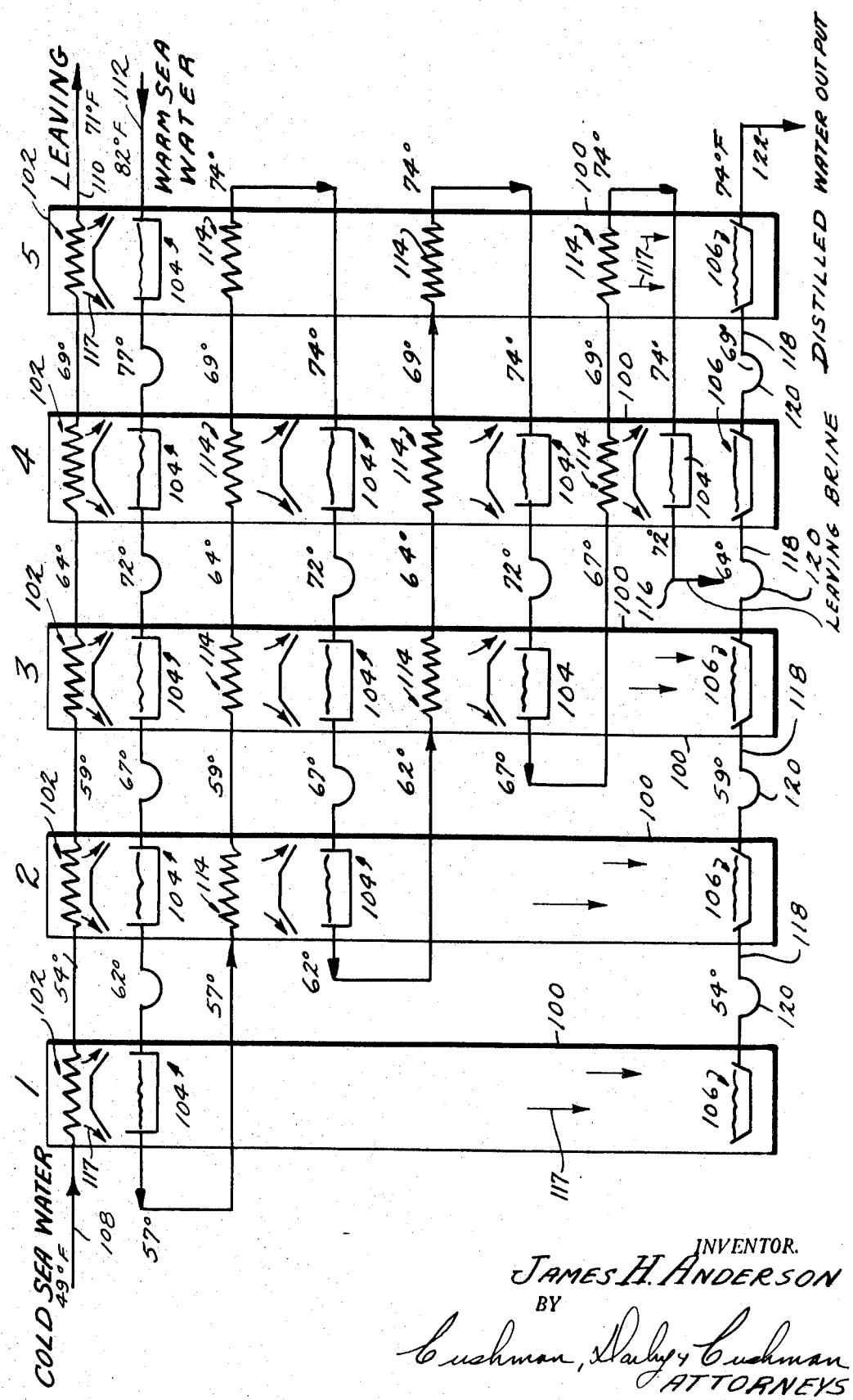

United States Patent Office 3,558,439
Patented Jan. 26, 1971

3,558,439
WATER DESALTING PROCESS AND APPARATUS
James H. Anderson, 1615 Hillock Lane,
York, Pa. 17403
Filed Dec. 28, 1967, Ser. No. 694,195
Int. Cl. B01d 1/28; C02b 1/06
U.S. Cl. 203—11
11 Claims

ABSTRACT OF THE DISCLOSURE

Apparatus and method for obtaining fresh water from sea water by deaerating and evaporating a stream of warm surface sea water and condensing the vapor. Evaporation is effected by subjecting the stream of warm surface water to a vacuum, the latent heat of vaporization being supplied by the warm water itself. The low pressure water vapor is then condensed by passing it in heat exchange relationship with a stream of relatively cold sea water obtained from deep in the sea. Deaeration of the sea water prior to evaporation is effected by elevating the stream of warm sea water above sea level and exposing it to stages of increasing vacuum.

---

This invention relates to the conversion of sea water to fresh water by a distillation process and in particular to a distillation process which makes economical use of the temperature differential between warm surface sea water and relatively cold deep sea water.

According to one feature of the present invention partial evaporation of a stream of warm surface and subsequent condensation is effected by pumping the warm deaerated stream through a boiler maintained at subatmospheric pressure, obtaining water vapor at a somewhat lower temperature by allowing the heat content of the water to supply the heat of vaporization absorbed during partial evaporation of the stream, and condensing the vapor at subatmospheric pressure by heat exchange with cold sea water in a condenser. Subatmospheric pressure is maintained in the boiler and the condenser, in part, by locating the boiler and condenser above sea level and passing the warm water to the boiler and back to the sea through sealed legs. The condenser includes a depending sealed fresh water leg which aids in maintaining the low pressure effected by condensation of the vapor.

It is important that the stream of warm sea water be freed of dissolved air before passing to the boiler, because the dissolved air reduces the efficiency of the distillation process and in addition is corrosive. More specifically the dissolved air effects a temperature differential between the boiling temperature of the warm water and the condensing temperature of the vapor, and this is undesirable because the system inherently must work with only small temperature differentials existing between the water employed for boiling and condensing.

Deaeration is effected by exhausting the space above the warm water stream to the atmosphere by means of an air compressor thereby subjecting the water to a reduced pressure at which dissolved air comes out of solution. According to the principles of the present invention the deaeration is carried out by passing the water stream through a sequence of deaerating stages each operating at a lower pressure than the preceding stage, because this procedure is more efficient and less costly than deaerating to the same degree by means of a single vacuum stage. One reason for this is that most of the air can be removed in the early stages, where the pressure is only slightly below atmospheric pressure, so that the work required to compress the liberated air to atmospheric pressure is not very great.

It is a further feature of the present invention, as it relates to deaeration, that the mixture of air and water vapor obtained from the water stream in each deaerating stage be cooled before passing to the air compressor so that the water vapor will be condensed. This reduces the volume flow to the compressor thereby permitting the use of a smaller compressor and reducing the power to drive the compressor. The air partial pressure in the space above the water in the deaerator is a function of the dissolved air concentration and is much greater than the vapor pressure of the water at initial dissolved air concentration; for example at 82° F. the vapor pressure, which is a function of temperature only, is 0.54 p.s.i.a. whereas a typical dissolved air concentration at one atmosphere total pressure is 19.4 p.p.m., corresponding to a partial pressure of 14.4 p.s.i.a. As the dissolved air content is reduced in subsequent deaerator stages, the air partial pressure in the vapor space decreases while the vapor pressure remains substantially constant, the result of this being that the air-vapor mixture becomes richer in water vapor at each successive stage; for example at 0.0194 p.p.m. dissolved air the air partial pressure is only 0.0144 p.s.i.a. with the result that the vapor pressure of the water is by far the greatest percentage of the total. Accordingly, the condensation of part of the water vapor to remove it from the mixture passing to the compressor is very important in reducing the load on the compressor.

As an example of the advantage of employing both multistage deaeration and cooling before each compressor stage, consider the reduction of dissolved air in a stream of 82° F. sea water from an initial concentration of 19.4 p.p.m. to a final concentration of 0.0194 p.p.m. It can be shown by calculation that for a water flow of $20.6 \times 10^6$ lbs./min. if this deaeration were effected by a single stage compression without cooling of the mixture passing to the compressor, the compressor would need to handle $5.7 \times 10^6$ c.f.m. (cubic feet per minute) and would require 106,000 HP (horsepower). If the air-vapor mixture were cooled to 60° F., the compressor inlet volume would be reduced to 250,000 c.f.m., and the power would be reduced to 4840 HP. If five stages of deaeration were used without cooling ahead of the first compressor, the volume flow to this compressor would be 147,000 c.f.m. If the gas-vapor mixture were cooled before each of the five compressors, the inlet volume would be 6800 c.f.m. to the first compressor and about 11,000 c.f.m. to the other stages, with a total power requirement for all stages of 684 HP.

According to another feature of the present invention a stream of warm water or other liquid is freed of dissolved gases by passing through a series of specially constructed vacuum deaerators. Each deaerator is located at a higher level above sea level or other liquid source than the previous one and is constructed in the form of a set of relatively shallow, slightly inclined trays. The water is passed to the higher ends of the lowermost set, then through a U-tube seal and then to the higher ends of the next higher set of trays. The vapor space above each set of trays is maintained at a subatmospheric pressure determined by its height above sea level. The water in the trays presents a large surface area through which dissolved gases are liberated, and the vapor space for each set of trays is connected with the inlet of an air compressor for discharging the air from that deaerator. In the preferred embodiment each tray is provided with a plurality of vertically disposed, rotating discs which dip into the water and serve to increase the water surface area so as to increase the efficiency of the deaerator.

The method and apparatus for obtaining deaerated water or other liquids, as disclosed herein, are not restricted to use in combination with the production of the fresh water from sea water.

The invention will be further understood from the following detailed discussion taken with the drawings in which:

FIG. 1 is a schematic elevational view of a sea water deaeration and distillation system embodying the principles of the present invention;

FIG. 2 is a fragmentary vertical sectional view, on an enlarged scale, of the warm water inlet section of the system of FIG. 1;

FIGS. 3, 4, 5, 6 and 7 are sectional views taken on the lines 3—3, 4—4, 5—5, 6—6 and 7—7, respectively, of FIG. 2;

FIG. 8 is a fragmentary vertical sectional view, of an enlarged scale, of the warm water outlet section of FIG. 1;

FIGS. 9, 10 and 11 are sectional views, on an enlarged scale, taken on the lines 9—9, 10—10 and 11—11 respectively, of FIGS. 1 and 8;

FIG. 12 is a schematic review of a modified boiler arrangement in which flashing deaerated sea water warms the cooler brine which is continually being formed; and FIGS. 13 and 14 are schematic views of hypothetical piping system employed in describing the operations of the system of FIG. 1.

Referring to FIG. 1 there is shown a system, embodying the principles of the present invention, for obtaining fresh water from the sea by distilling a portion of a stream of warm surface water and condensing the vapor by heat exchange with a stream of relatively cold water obtained from deep in the sea. In operation the system will handle very large quantities of warm and relatively cold water, and it is contemplated that the system will be most economically employed in conjunction with some other system which requires two large capacity streams of water at different temperatures. For example in my Pat. No. 3,312,054 entitled Sea Water Power Plant there is disclosed a closed working fluid cycle in which the working fluid is first vaporized by heat exchange with a stream of warm surface sea water and subsequently condensed by heat exchange with a stream of relatively cold deep sea water. These streams of sea water, even after they have been passed in heat exchange relationship with the working fluid are sufficiently different in temperature to be suitable for use in the present system. However, the success of the present invention does not depend on the presence of any such system.

The warm sea water portion of the system of FIG. 1 includes a generally vertical inlet pipe 10, five deaerator stages 12, two series-connected flash boilers 14 and 16 and a depending warm water discharge pipe 18. The lower ends of the inlet and discharge pipes 10 and 18 are disposed below the surface 20 of the sea, and the entire circuit is substantially leakproof to prevent ambient air from entering. The lower end of the inlet pipe 10 is open directly to the surface water which is warm relative to the water deep in the sea. As previously indicated the warm water stream may be obtained from the power plant described in my aforesaid Pat. No. 3,312,054 or, as shown, the driving force for moving the stream may be provided by a pump 22 in the warm water circuit.

The fresh water portion of the system includes two condensers 24 and 26 in which low pressure water vapor from the boilers 14 and 16 is condensed by heat exchange with relatively cold water from deep in the sea. As shown schematically each condenser is disposed above sea level and is constructed of a sealed shell 28 having a heat exchanger 30 carried in its upper portion. The condensers 24 and 26 terminate at their lower ends in depending legs 32 into which fresh water flows from one set of channels in the heat exchangers 30. Water vapor from the boilers 14 and 16 is conducted to the upper ends of these heat exchanger channels through suitable pipes 34 and 36.

The other channels in the heat exchangers 30 carry a stream of relatively cold deep sea water. This stream may be obtained, for example, from the sea water outlet of the working fluid condenser disclosed in my aforesaid Pat. No. 3,312,054 or, as shown, from a separate pipe 38 and associated pump 40. The lower end of the pipe 38 is disposed deep in the sea, and the entire pipe is supported by suitable suspension or buoyant means (not shown). Cold water is pumped upwardly through the pipe 38 and flows first through the heat exchanger 30 in the condenser 26 and then through a pipe 42 to the heat exchanger 30 in the other condenser 24. From the latter a pipe 44 conducts the cold water to a series of heat exchangers 46 which are part of both the fresh water portion and the deaeration portion of the system. From the last heat exchanger 46 in the series the water is returned to the sea through a depending pipe 48.

Deaeration of the stream of warm sea water is effected in the deaerator stages 12 by subjecting the water therein to a lower pressure in each succeeding stage. The dissolved gases which are liberated in each stage 12 are drawn off through a separate pipe 50 which connects with the inlet of a compressor 52. The outlet of the compressor 52 which is associated with the first deaerator stage 12 discharges to atmosphere, or if desired, to equipment 53 for separating and recovering oxygen from a gaseous mixture. Since the dissolved gases liberated from sea water contain a somewhat higher portion of oxygen than air, it may often be economically desirable to retrieve the oxygen. The outlet of each subsequent compressor 52 connects by a pipe 54 with the next downstream heat exchanger 46 for heat exchange with the cold water stream. A pipe 56 then passes the gas to the inlet of the next compressor 52.

The space above the sea water in each deaerator stage 12 will contain not only liberated gases but also some water vapor, the proportion of gas to vapor depending on the pressure, temperature and number of previous deaerator stages. In order to retrieve this water vapor the contents of each deaerator pipe 50 passes through one of the heat exchangers 46 before flowing to its respective compressor 52. The condensed water vapor is collected from each air cooler 46 and drains out through a pipe 57. The coolers toward the left of the diagram cool air at the lower pressures, and this contains a relatively higher percentage of water vapor than those at higher pressure. Condensing out the fresh water in each cooler appreciably reduces the volume flow to the following compressor, thereby reducing compressor size and power requirement.

The system requires a very large mass flow rate of warm sea water, and in order to operate the system with as low pumping power as possible it is desirable to reduce friction losses in the warm water circuit. At the same time, of course, it is desirable to deaerate the warm water in an efficient manner. These considerations contraindicate the use of conventional surface area equipment such as packed columns because of the high energy losses which would result in the handling of large quantities of water. As shown in FIGS. 2 and 3 the present invention contemplates a special construction of the deaerator stages 12 through which the water flows smoothly in the form of a plurality of shallow streams 58 each with its own overlying air space 60. The shallow streams 58 are formed by a plurality of inclined walls 62 disposed one above the other and sealed along each longitudinal edge to an upright side wall 64, 66. The inclined walls 62, with the exception of the uppermost wall, together with adjacent portions of the side walls 64 and 66 hereby serve as channels or trays for retaining the water 58 while dissolved gases pass into the air space 60 above each layer of water.

As shown in FIG. 3 each deaerator stage 12 includes two sets of six water trays the sets being disposed parallel to each other with a chamber 68 therebetween. The chamber is bounded by the uppermost and lowermost inclined walls 62, the side walls 66 and two longitudinally spaced apart end walls 70, 71. The side walls 66 are provided with a plurality of apertures 72 above the level of the water 58 in each channel to permit liberated gases to pass into the chamber 68. The pipe 50 which leads to the inlet of one of the compressors 52 connects with the bottom of the chamber 68.

In order to increase the surface area of the water in the trays and thereby increase deaeration, each tray may include a plurality of rotating discs 74 which dip into the water. In FIGS. 2 and 3 the tray which is second from the top is shown as being provided with the discs 74. In the interest of simplicity of illustration the discs have been omitted from the other trays. Preferably the discs 74 are positively rotated through a suitable drive train, although the flow of water through the trays may be relied on to effect the desired rotation. In the illustrated embodiment the discs 74 are mounted on a plurality of shafts 76 extending transversely of the trays, and the shafts 76 are drivingly interconnected within the chamber 68, as shown at 78. While the size of the equipment is not critical, it is contemplated that the discs 74 may be 9 inches in diameter and mounted 8 per inch on each shaft 76.

Each of the deaerator stages 12 communicates with the adjacent stage through a U-tube connector section 80 which effects a water seal between the air spaces of the two stages 12. As shown in FIGS. 2 and 4 the inclined walls 62 are continuous through the sections 80 so that the water channels of one stage 12 are continuous with the water channels in the adjacent stages. However, the walls 62 are more closely spaced so as to eliminate an air space. The seal, which is effected by the legs of water, prevents communication between the air spaces so that each successive stage 12 may operate at a lower pressure.

The lower end of the uppermost deaerator stage 12 connects with a set of flow channels in the first boiler 14 through a U-tube section 80, as seen in FIG. 1. These same flow channels connect with the lower ends of a corresponding set of channels in the second boiler 16 through a U-tube section 80a. Both sets of channels are inclined in the same manner as the trays in the deaerator stages 12. The channels in the boilers are defined by continuations of the walls 62, and these continuations extend part way into the warm water discharge pipe 18, as seen at 62b in FIG. 8. The spaces above the water in the boilers 14 and 16 communicate with the condensers 24 and 26 through the lines 34 and 36, respectively, as described previously. Any gases carried into the condenser 24 is removed through a line 82 which connects with the inlet of a compressor 84. Air in the condenser 26 is removed through a similar line 86 and compressor 88. The outlets of the compressors 84 and 88 connect with separate heat exchangers 46 for heat exchange with the cold water stream. After passage through these heat exchangers the air passes through a line 90 into the inlet of the compressor which is associated with the last deaerator stage 12.

The lines 82 and 86 each include a heat exchanger section 92 in which the contents of the lines are cooled by cold water from the pipe 38. As shown, the lines 82 and 86 pass upwardly through the heat exchanger 30 associated with the condenser 26.

The warm water inlet pipe 10 is shaped so as to minimize friction losses. As shown in FIGS. 2, 5, 6 and 7 the walls 62 in the deaerator lowermost stage are continued downwardly, as walls 62a, to form the upper portion of the pipe 10 thereby maintaining the identities of the individual water channels in this portion. The side walls 66 merge into a single center wall 66a thereby eliminating the chamber 68 shown in FIG. 3. The overall cross sectional shape of the pipe 10 is rectangular, and the cross sectional area decreases uniformly from the upper end of the pipe to a point just above sea level 20.

The lower end of the pipe 10 flares outwardly to aid in maintaining a non-turbulent flow of water. The walls 62a are discontinuous in the region of the smallest cross section of the pipe 10 as indicated at 62c so that the water channels are in communication with each other in this high velocity region. The function of this structure will be described hereinafter.

The warm water outet pipe 18 is also shaped to minimize friction losses. As shown in FIGS. 9, 10 and 11 the cross sectional area of the pipe 18 first diminishes and then increases again near its lower end, gradually changing to a circular section at the pump shown in FIG. 11.

FIG. 12 illustrates schematically a modified boiler and condenser arrangement which achieves a greater fresh water yield from a given quantity of warm and cold sea water. In this modification a stream of deaerated warm sea water obtained from a deaerating system such as that shown in FIG. 2 is (1) partially flashed in each of a plurality of series-connected stages, (2) warmed slightly and then (3) again flashed in a plurality of series-connected stages. The warming step is carried out by employing the cool brine from step (1) as the condensing medium for the vapor obtained in step (2). The condensing medium in step (1) is cold set water obtained from deep in the sea as described previously.

The FIG. 12 arrangement includes five stages, Nos. I, II, III, IV and V, although any number of stages may be provided. Each stage comprises a closed housing 100 forming a sealed, subatmospheric-pressure chamber which encloses at least one condenser, illustrated as a coil 102, at least one flash chamber 104, and at least one receptacle or tray 106 for collecting condensed fresh water. Cold sea water enters the system through a pipe 108, passes sequentially through the condenser coils 102 in stages Nos. I through V and leaves through a pipe 110. Warm deaerated sea water enters the system through a pipe 112, passes through a series of flash chambers 104 and condenser coils 114, in the various stages and leaves through a pipe 116. Water vapor from the various flash chambers 104 condenses on the respective coils 102 or 114 and drains into the tray 106 in the respective stage, as illustrated by arrows 117. The trays 106 are connected by lines 118, each of which includes a loop trap 120, and the fresh water drains from one tray to the next, finally leaving the system through a pipe 122.

Referring more specifically to the flow of deaerated sea water it will be seen that the incoming water, for example at 82° F., flows first through the flash chambers 104 in stages Nos. V, IV, III, II and I and then passes through the condenser coil 114 in stage II. The heat for evaporating a portion of the water in each flash chamber 104 is provided by the water itself so that the water becomes cooled in each stage. The water leaving the chamber 104 of stage I will be cooled to, for example, 57° F., and is then passed through the coil 114 in stage II to condense steam being formed at a higher temperature. The water absorbs heat during this operation but is still cool enough to be passed to the coils 114 of stages III, IV and V for condensing steam in those stages. The water leaves stage V at, for example, 74° F. and passes to a second sequence of flash chambers 104 in stages IV, III and II and then to a second sequence of condensing coils 114 in stages III, IV and V. A third flashing sequence occurs in stages IV and III, and a third condensing sequence occurs in stages IV and V, following which a final flashing occurs in stage IV.

Each stage is initially evacuated so that no air is present. Under these conditions the pressure of the steam in each stage will be the vapor pressure of the warm sea water which is flashing in the respective flash chambers 104. Transfer of pressure between stages is prevented by the loops 120 in the lines 118 connecting the flash chambers 104. The distilled fresh water is removed from stage V by providing a pump (not shown) in the line 122 or by connecting the line 122 to the upper end of a leg (not shown) of sufficient length to effect the necessary vacuum.

OPERATION

If we consider each deaerator stage 12 as a single tray, then, for the water to fill the inlet of the tray to the proper level the pressure of the atmosphere minus the pressure above the water must equal the pressure difference of a water leg of such height to produce this pressure.

For example, if atmospheric pressure is 14.7 p.s.i.a. and tray pressure is 5.36 p.s.i.a., as maintained by the compressor 52, then the pressure difference corresponding to the height of water above sea level would be $$14.7 - 5.36 = 9.34 \text{ p.s.i.}$$

Since salt water weighs 64 lbs./cu. ft. the height of water column will be $$\frac{9.34 \times 144}{64} = 21.0 \text{ ft.}$$

At this height the tray would theoretically be filled to the proper level. However, no flow into the tray would occur, because of friction loss and the kinetic energy required to move the water at a finite velocity. For a finite velocity V, at the same pressure of 5.36 p.s.i.a., the height would have to be reduced by the velocity head and some fraction $k$ of the velocity head representing the friction loss through the inlet pipe to the tray. The required height is then $$H = 21.0 - \frac{V^2}{2g} - k\frac{V^2}{2g}$$

The tray must slope downwardly to the left in order to overcome the friction loss in the tray to keep the velocity constant, and the depth of the water in the tray constant.

The height of the second tray above the left end of the first tray can be computed in the same way as for the first tray, but since the kinetic energy already exists at the end of the first tray this does not have to be generated again. Then theoretical $$H = (5.36 - 1.96)\frac{144}{64} = 7.65 \text{ feet}$$

Actual height $$7.65 - K\frac{V^2}{2g}$$

where K is the fraction of kinetic energy lost in friction between the first and second tray. The height of successive trays can be calculated in a similar way.

The result of the summation of friction losses is that the height of the outlet of the highest tray is less than the theoretical height by an amount equivalent to the friction loss head and the kinetic energy head. Since the height at the outlet of the tray is less than the theoretical height there is not enough height to cause the column to fall and no flow would occur. To overcome this the pump 22 must be used to generate enough head to overcome the friction loss.

An alternative scheme is to make the height of the leaving end of the trays equal to that required to remove the water without a pump. In this case the height of the inlet tray must be higher, and the head loss can be supplied by a pump in the inlet line providing enough head to lift the water to the additional height required. If we make the tray height intermediate between the above two extremes, then energy would have to be supplied by a pump at each end. If we make the height of the first tray lower than that shown by the previously mentioned equation, then the tray would overfill, because excess energy is available in the inlet. In order to prevent overfilling of this tray we must use up this excess energy. This can be accomplished by (1) providing a throttle valve or construction in the inlet line to increase the friction, thereby wasting energy, (2) utilizing the energy to power a turbine which can help drive the pump 22 on the outlet line or (3) utilizing the energy in a jet pump to help pump the water in an adjacent channel.

If we make the trays higher than the required height for the exactly balanced case with the pump on the inlet, then we have energy left over in the discharge line, which will be wasted in excess velocity and tubulence in the discharge line. Here again it is possible to put a turbine in the discharge line, and use the power to help drive the pump on the inlet line.

It is now evident that there are only two heights for which only one pump is needed, and no energy is wasted, without using a power generating device. At heights below the lower one we need a turbine on the inlet and a pump on the discharge. At the lower critical height we need a pump on the discharge only. At intermediate heights we need a pump on the discharge and a pump on the inlet. At the upper critical height we need a pump on the inlet only. At heights above the upper critical height we need a pump on the inlet and a turbine on the discharge.

In practice, in order to reduce the physical size of the plant it is desirable to employ multiple trays, one above the other, and to apply the abovediscussed principles to each tray. In a multiple tray arrangement each tray is at a different height, and it is theoretically necessary to use a different pumping combination for each height. In order to avoid the costly and complicated relationship the system employs a jet pump arrangement which transfers some energy from one flow channel to an adjacent one, thereby minimizing the throttling losses as well as reducing the cost of the equipment. The jet pump arrangement is effected by placing the flow channels in communication with each other at the high velocity sections in the inlet pipe 10 and outlet pipe 18, as shown at 62c in FIG. 2 and at 62d in FIG. 8.

The principles of energy transfer by jet pump action are described with reference to FIGS. 13 and 14 which are schematic illustrations of hypothetical pumping systems. At a given point in a flow channel the total hydraulic energy E rate in the water is given by $$E = Mg\left(h + \frac{v^2}{g} + \frac{p}{\rho}\right)$$

where M is the mass flow rate past the given point, $h$ is height above sea level, $v$ is the velocity past the point, $p$ is the absolute pressure, $\rho$ is the density of the water, and $g$ is the gravitational acceleration. It is well known in hydraulics that for energy to be conserved, if we increase the velocity, either $h$ must be reduced or $p$ must be reduced. Conversely by reducing velocity we convert kinetic energy into increased pressure of increased $h$.

In FIG. 13 there are shown schematically two channels entirely separated from each other. In Channel A $$\frac{p_0 - p_2}{\rho} > h_2$$

Therefore the water will rise higher than $h_2$ because more than enough energy is available to lift the water to $h_2$. In channel B $$\frac{p_0 - p_2}{\rho} < h_2$$

Therefore the water would not be lifted to $h_2$. In order to lift the water to $h_2$ we must add energy to the stream.

Now, if we can transfer the excess energy from stream A to stream B, we can have both streams operate and lift water to their respective desired levels. One way to do this, as suggested hereinbefore, is to put a turbine in stream A, and use it to drive a pump in stream B. A second way is to connect the streams together at a point of high velocity or high kinetic energy.

FIG. 14 illustrates schematically how this may be accomplished. A common inlet pipe I is placed horizontally in the water as shown or at an inclined angle. From the inlet at $v_0$ to $v_1$ the channel is made smaller so that at $v_1$ the flow velocity is much higher. This means that part of the energy has been converted to kinetic energy $mv^2/2$.

Since velocity is directional, and since pipe A is set at right angles to the inlet pipe, the kinetic energy is not available to lift water into pipe A. Therefore, this amount of energy has been subtracted from the water in pipe A, and it cannot be lifted as high as it otherwise would have been, if the kinetic energy at $V_1$ were converted to pressure energy to lift the water. In the inlet pipe I to the right of $v_1$ the area is gradually enlarged to reduce the velocity to $v_2$. This slowing down converts kinetic energy into pressure energy available to lift the water higher in pipe B than in pipe A.

It follows that the same analysis can be applied to more than two channels, such as the channels in the warm water inlet pipe 10 which are in communication at 62c. In the case of outlet pipe 18 in FIG. 8, wherein the channels are in communication at 62d, the situation is somewhat different. Here each individual stream falls from a different height to a common level. In this case the additional height is converted to higher velocity which then adds kinetic energy to the combined flow.

With respect to the deaerating action of the stages 12 the advantage of reduced power consumption achieved by the use of a plurality of stages 12 and the cooling of the air-vapor mixtures passing to the compressors 52 has already been described. Approximate temperatures for the various water flows in a typical system are shown in FIG. 1.

While preferred embodiments of the present invention have been described, the details thereof are not intended to be limiting except as they appear in the appended claims.

What is claimed is:

1. Apparatus for obtaining fresh water from sea water by vaporizing part of a stream of warm surface water and condensing the vapor by heat exchange with a stream of relatively cold water, said apparatus comprising:

an upstanding warm water inlet pipe having its lower end in communication with warm surface sea water and its upper end above sea level;

an upstanding warm water discharge pipe having its lower end in communication with the sea and its upper end above sea level;

a deaerator including at least one elongated channel connected at one end to the upper end of said warm water inlet pipe and defining therewith a flow channel for warm sea water and an overlying air space in the uppermost section of said channel;

a boiler including at least one channel connected in series with said deaerator channel and defining a flow channel for warm sea water and an overlying vapor space;

a U-tube section connecting the other end of said deaerator channel with one end of said boiler channel and forming a water seal between said air space of the deaerator and said vapor space of the boiler;

conduit means connecting the other end of said boiler channel with said warm water discharge pipe;

pump means for pumping warm sea water upwardly through said inlet pipe, through said deaerator and boiler and downwardly through said discharge pipe;

means for maintaining said air space in said deaerator at subatmospheric pressure and for removing gas liberated into said space from the warm sea water, said means including a gas compressor, said compressor having an inlet and outlet, said inlet being in communication with said air space;

a condenser including a heat exchanger having two sets of flow channels;

conduit means for conducting vapor from said boiler vapor space to one set of said heat exchanger flow channels;

pump and conduit means extending deep in the sea for conducting relatively cold sea water through said other set of heat exchanger channels thereby to condense said vapor into fresh water;

and means for withdrawing said fresh water from said condenser.

2. Apparatus as in claim 1 further including heat exchanger means for condensing water vapor from the gas removed from said air space, said heat exchanger having two sets of flow channels, one of which is connected to said condenser to receive cold sea water therefrom and the other of which is connected to receive the gas being withdrawn from said air space in said deaerator.

3. Apparatus as in claim 1 wherein said deaerator includes a series of elongated channels each having a water flow space and an overlying air space, said channels being disposed at successively higher elevations beginning with the channel which is connected to the upper end of said warm water inlet pipe, said channels being connected end-to-end in series by liquid-filled connections which form a liquid seal between each channel and the next channel.

4. Apparatus as in claim 3 wherein there is a separate compressor associated with each air space, the outlet of each compressor being in communication with the inlet of the compressor associated with the next lower channel.

5. In apparatus for deaerating a stream of liquid obtained from source thereof and for subsequently vaporizing a portion of the stream and comprising: at least one channel means having an enclosed vapor-containing space above a liquid-containing space, said channel means being disposed above the surface of said source; first liquid-filled inlet connecting means placing one end of said channel means in communication with the source below the surface thereof; second liquid-filled outlet connecting means placing the other end of said channel means in communication with the source below the surface thereof; heat exchange means connected to the vapor space for cooling the vapor and condensing the same; pump means for flowing a steam of the liquid upwardly from the source through said first connecting means, downwardly through the liquid-containing space in said channel means and through said second connecting means whereby a subatmospheric pressure is produced in the vapor-containing space in said channel means and whereby at least a portion of dissolved gases pass from the liquid into said vapor-containing space; and mechanical compressor means having an inlet in communication with said heat exchange means for withdrawing gas and vapor from said vapor space and for maintaining the subatmospheric pressure therein.

6. Apparatus as in claim 5 including a plurality of said channel means connected in series by means of liquid-filled tubular connections which form a liquid seal between each channel means and the next channel means, each of said channel means being disposed at a higher elevation above said source of liquid than the next adjacent upstream channel means whereby the vapor-containing space of each successively higher channel means operates at a successively lower pressure and wherein a separate compressor means is associated with each inclined channel means for withdrawing gas and vapor from the vapor-containing space of the respective channel means.

7. Apparatus as in claim 6 wherein the outlet of each compressor means is in communication with the inlet of the compressor means associated with the next lower channel means.

8. Apparatus as in claim 5 wherein each channel means includes walls defining a plurality of distinct parallel generally coextensive inclined channels disposed one above the other; wherein said means placing the one end of said channel means in communication with said source of liquid includes an upstanding liquid inlet pipe which is tapered inwardly near its lower end so as to have a high velocity section of reduced transverse cross section nearest its lower end and having internal wall means cooperating with the walls defining said plurlity of channels to extend said channels into said inlet pipe, said wall means terminating at their lower ends in said high velocity section of said inlet pipe thereby placing said channels in communication in that section; and wherein said means for placing the other end of said channel means in communication with said source of liquid includes an upstanding outlet pipe having a transverse cross sectional area near its upper end less than the combined cross sectional areas of said channels so as to have a high velocity section near its upper end, said outlet pipe having internal wall means cooperating with the walls defining said plurality of channels to extend said channels into said outlet pipe.

9. Apparatus as in claim 5 including means in said channel means for increasing the surface area of the liquid therein comprising a plurality of rotatable disk-like elements arranged with their axes of rotation transverse to the direction of liquid flow, said disk-like elements having their lower portions dipping into the liquid-containing space and their upper portions disposed in the vapor-containing space.

10. A method for obtaining fresh water from sea water by a distillation process, said method comprising:
withdrawing a stream of warm sea water from the sea;
deaerating the stream of warm sea water by passing it sequentially through a plurality of zones of subatmospheric pressure to liberate gas from the water and mechanically removing the liberated gases from each of said zones so as to maintain the subatmospheric pressure in said zones;
boiling a portion of the deaerated warm sea water to covert it to steam by passing the deaerated water through another zone of subatmospheric pressure substantially equal to the vapor pressure of the deaerated warm water;
withdrawing a stream of relatively cold sea water from the sea;
condensing the steam by passing it in heat exchange relationship with said stream of relatively cold sea water;
and condensing the water vapor obtained from each deaerating step before removing and compressing the liberated gases by passing relatively cold sea water in heat exchange relationship with the gases and water vapor obtained in the deaerating steps thereby reducing the volume flow and reducing the power required to remove and compress the liberated gases.

11. A method as in claim 10 wherein the relatively cold sea water employed to condense the water vapor from said deaerating stages is the water which has been employed to condense the steam from the boiling step.

References Cited

UNITED STATES PATENTS

| | | | |
|---|---|---|---|
| 1,518,784 | 12/1924 | Gibson | 55—39 |
| 2,006,985 | 7/1935 | Claude et al. | 203—10X |
| 2,589,406 | 3/1952 | Latham, Jr. | 203—24 |
| 2,636,129 | 4/1953 | Agnew | 202—205X |
| 2,636,485 | 4/1953 | Hillier | 55—198X |
| 2,863,501 | 12/1958 | Farnsworth | 159—24 |
| 3,138,546 | 6/1964 | Muller | 203—10X |
| 3,140,986 | 7/1964 | Hubbard | 203—11 |
| 3,155,600 | 11/1964 | Williamson | 203—11 |
| 3,312,054 | 4/1967 | Anderson et al. | 60—26 |
| 3,414,481 | 12/1968 | Kelly, Jr. | 203—10X |

NORMAN YUDKOFF, Primary Examiner

F. E. DRUMMOND, Assistant Examiner

U.S. Cl. X.R.

60—26; 202—173, 176, 186, 205